United States Patent
Lee

(10) Patent No.: US 11,848,543 B2
(45) Date of Patent: Dec. 19, 2023

(54) POWER TRANSMISSION UNDERGROUND CABLE WINDING DEVICE AND POWER TRANSMISSION UNDERGROUND CABLE SPREADING SYSTEM COMPRISING SAME

(71) Applicant: SN ENC CO., LTD., Pyeongtaek-si (KR)

(72) Inventor: Su Yeol Lee, Goyang-si (KR)

(73) Assignee: SN ENC CO., LTD., Pyeongtaek-si (KR)

( * ) Notice: Subject to any disclaimer, the term of this patent is extended or adjusted under 35 U.S.C. 154(b) by 282 days.

(21) Appl. No.: 17/274,083

(22) PCT Filed: Sep. 6, 2019

(86) PCT No.: PCT/KR2019/011567
§ 371 (c)(1),
(2) Date: Mar. 5, 2021

(87) PCT Pub. No.: WO2020/050692
PCT Pub. Date: Mar. 12, 2020

(65) Prior Publication Data
US 2021/0296865 A1 Sep. 23, 2021

(30) Foreign Application Priority Data
Sep. 6, 2018 (KR) .................... 10-2018-0106592

(51) Int. Cl.
*H02G 1/08* (2006.01)
*H02G 1/02* (2006.01)
(Continued)

(52) U.S. Cl.
CPC .............. *H02G 1/081* (2013.01); *H02G 1/02* (2013.01); *H02G 9/06* (2013.01); *H02G 9/08* (2013.01); *H02G 9/10* (2013.01); *H02G 11/02* (2013.01)

(58) Field of Classification Search
CPC ............ B65H 2403/40; B65H 2403/41; B65H 2701/34; B65H 54/34; B65H 54/42;
(Continued)

(56) References Cited

U.S. PATENT DOCUMENTS

| 6,179,239 B1* | 1/2001 | Linderoth ............... B65H 54/42 242/582 |
| 8,398,013 B2* | 3/2013 | Skalleberg ............. B65H 49/38 242/486.2 |
| 2005/0115337 A1 | 6/2005 | Tarumi |

FOREIGN PATENT DOCUMENTS

| KR | 100842283 B1 | 6/2008 |
| KR | 20100053382 A * | 5/2010 |

(Continued)

OTHER PUBLICATIONS

HowStuffWorks. "How Gears Work". https://science.howstuffworks.com/transport/engines-equipment/gear.htm (Year: 2022).*

*Primary Examiner* — Tyrone V Hall, Jr.
(74) *Attorney, Agent, or Firm* — Rabin & Berdo, P.C.

(57) ABSTRACT

The present invention relates to a power transmission underground cable winding device and a power transmission underground cable spreading system comprising same and, more specifically, to: a power transmission underground cable winding device for installing a power transmission three-phase underground cable in an underground power tunnel or conduit; and a power transmission underground cable spreading system comprising same.

10 Claims, 13 Drawing Sheets

(51) Int. Cl.
*H02G 9/06* (2006.01)
*H02G 9/08* (2006.01)
*H02G 9/10* (2006.01)
*H02G 11/02* (2006.01)

(58) Field of Classification Search
CPC .... B65H 54/44; B65H 54/52; B65H 75/4428; B65H 75/4486; B65H 75/4481; H02G 1/06; H02G 1/08; H02G 1/081; H02G 1/088; H02G 1/10; H02G 11/00; H02G 11/02; H02G 9/00; H02G 9/02; H02G 9/06; H02G 9/065; H02G 9/08; H02G 9/10
See application file for complete search history.

(56) References Cited

FOREIGN PATENT DOCUMENTS

| | | |
|---|---|---|
| KR | 100976843 B1 | 8/2010 |
| KR | 100978003 B1 | 8/2010 |
| KR | 100981710 B1 | 9/2010 |
| KR | 101027732 B1 | 4/2011 |
| KR | 101029053 B1 | 4/2011 |
| KR | 101159700 B1 | 6/2012 |
| KR | 101347181 B1 | 1/2014 |
| KR | 1020160001105 A | 1/2016 |

\* cited by examiner

000
POWER TRANSMISSION UNDERGROUND CABLE WINDING DEVICE AND POWER TRANSMISSION UNDERGROUND CABLE SPREADING SYSTEM COMPRISING SAME

TECHNICAL FIELD

The present invention relates to a power transmission underground cable winding device and a power transmission underground cable spreading system comprising same and, more specifically, to: a power transmission underground cable winding device for installing a power transmission three-phase underground cable in an underground power tunnel or conduit; and a power transmission underground cable spreading system comprising same.

BACKGROUND ART

In general, electricity is produced in a power plant, transported to a substation in a high voltage state during power transmission, and supplied from the substation to houses or factories through voltage transformation during power distribution. In order to achieve smooth power transmission, it is required to install relatively large and heavy cables that transport high-voltage electricity.

In particular, power transmission facilities, including cables required during the power transmission, are preferably installed under the ground rather than on the ground for reasons such as stable supply of power, improvement of supply reliability, and beautification of urban environment. Therefore, they have to be installed in conduits or underground power tunnels installed under the ground, and accordingly, a pulling operation is performed to convey the cables which is to be installed under the ground.

According to the related art, during the pulling operation described above, a cable is placed on the bottom of an underground conduit or underground power tunnel in a state where a drum is placed on the ground, and a wire is connected to an end of the cable. Then, the cable is carried by pulling the wire to the drum. However, since this operation is performed by only manpower of workers, a period of time for blocking a road is extended to cause civil complaints, and safety of workers is not ensured.

In addition, for a three-phase cable, it is not possible to perform works for three cables at the same time. Thus, the pulling operation has to be individually performed for each of cables, resulting in increase in work costs and times.

Accordingly, Korean Patent Registration No. 10-1027732 discloses a multi-line cable pulling device for a drum cable, and a plurality of drums are individually rotated by independent drive bodies to pull multi-line cables, but in this case, a plurality of drive sources have to be installed for the respective drive bodies. Thus, the structure thereof becomes complicated, and production costs increase. Also, this device is available only to relatively lightweight distribution cables but may not be used for heavy power transmission cables.

Furthermore, when the multi-line cables are simultaneously unwound, the wires are tangled or twisted during the pulling process, and the tangled wires have to be removed and joined again. Thus, normal work becomes impossible.

(Patent Document 1) KR10-1027732 B

In addition, as a power transmission facility for transporting electric power produced in a power plant to a substation, a power transmission underground cable winding device according to the related art is a device for winding a large-size electric wire through which a high-voltage current of 354 KV flows. A cable is a heavy electric wire having the weight of 6-7 kg per 1 m, and thus a device for unwinding or winding the cable through rotation may not properly work.

In particular, in the power transmission underground cable winding device according to the related art, a motor is installed on a drum on which a cable is wound, and the drum is directly rotated to wind or unwind the cable. Thus, when the heavy cable is wound or unwound, durability is deteriorated, or smooth winding became difficult due to a large load.

DISCLOSURE OF THE INVENTION

Technical Problem

To solve the above-described problems, the purpose of the present invention is to provide: a power transmission underground cable winding device capable of winding or unwinding a power transmission underground cable through smooth rotation; and a power transmission underground cable spreading system comprising same.

Technical Solution

The present invention has been made to achieve the objective of the present invention described above and includes: a base (20); a pair of support units (800) installed spaced apart from each other on the base (20); a cable drum unit (600) which is spaced apart from the base (20) and supported by the pair of support units (800), and configured to unwind a power transmission cable (2), which has been wound, or wind and collect the same through rotation; and a cable drum drive unit (700) configured to rotate the cable drum unit (600).

The cable drum unit (600) may include: a rotation shaft (610) installed across the pair of the support units (800); a winding part (620) coupled to the rotation shaft (610) and configured to unwind the power transmission cable (2), which has been wound, or wind and collect the same through rotation; and a partition wall part (630) expanding from at least one end of the winding part (620) in a direction perpendicular to the rotation shaft (610).

The cable drum drive unit (700) may be installed to interfere with the partition wall part (630), rotate the partition wall part (630) through rotation in an interference state, and rotate the cable drum unit (600) about the rotation shaft (610).

The partition wall part (630) may include an circumferential surface (631), which comes into close contact with the cable drum drive unit (700), to rotate through the interference as the cable drum drive unit (700) rotates.

The partition wall part (630) may have a plurality of grooves, which are formed on the circumferential surface (631) and engage with the cable drum drive unit (700), to rotate while engaging with the cable drum drive unit (700).

The pair of support units (800) may include: a rotation shaft support part (810) configured to rotatably support the rotation shaft (610); and a vertical drive part (820) provided below the rotation shaft support part (810) to drive the rotation shaft support part (810) in the up-down direction.

The vertical drive part (820) may be a hydraulic cylinder installed perpendicularly to the base (20).

The cable drum drive unit (700) may include at least one of a lower cable drum drive part (710) which rotates, while interfering with the partition wall part (630), below the center of the partition wall part (630) or an upper cable drum drive part (720) which rotates, while interfering with the partition wall part (630), above the center of the partition wall part (630).

The lower cable drum drive part (710) may include: a lower rotation part (730) rotating in close contact with the partition wall part (630); a lower rotation part-driving part driven to rotate the lower rotation part (730); and a lower arm part (740) having one end to which the lower rotation part (730) is rotatably installed and the other end installed on the base (20).

The lower cable drum drive part (710) may further include a lower arm part-driving part (750) which linearly drives the lower arm part (740) toward the partition wall part (630) for close contact with the partition wall part (630) in a state in which the cable drum unit (600) is supported by the pair of the support units (800).

The upper cable drum drive part (720) may include: an upper rotation part (760) rotating in close contact with the partition wall part (630); an upper rotation part-driving part driven to rotate the upper rotation part (760); and an upper arm part (770) having one end to which the upper rotation part (760) is rotatably installed and the other end installed on the base (20).

The upper cable drum drive part (720) may further include an upper arm part-driving part (780) which is driven to separate the upper arm part (770) from the partition wall part (630), thereby preventing interference with the partition wall part (630) when the cable drum unit (600) is supported by or removed from the pair of the support units (800).

The lower cable drum drive part (710) and the upper cable drum drive part (720) may be symmetrical to each other with respect to the rotation shaft (610) and installed on the partition wall part (630).

Advantageous Effects

In the power transmission underground cable winding device according to the present invention and the power transmission underground cable spreading system including same, heavy and large-size multi-line underground cables may be automatically carried by using a pulling system installed on the ground. Accordingly, safety of workers is ensured, and work time is reduced to lower work costs.

Also, in the power transmission underground cable winding device according to the present invention and the power transmission underground cable spreading system including same, a plurality of heavy power transmission underground cables are carried through power distribution from a single power source, thereby simplifying the structure of the system and lowering production costs.

Also, in the power transmission underground cable winding device according to the present invention and the power transmission underground cable spreading system including same, mechanical energy is converted into hydraulic energy, and the hydraulic energy is used to drive the device. Thus, precise control is possible during a process of carrying a plurality of underground cables.

Also, in the power transmission underground cable winding device according to the present invention and the power transmission underground cable spreading system including same, wires are prevented from being tangled even when multi-line underground cables are simultaneously carried. Thus, it is possible to perform work smoothly.

Also, in the power transmission underground cable winding device according to the present invention and the power transmission underground cable spreading system including same, a cable drum for winding or unwinding a heavy cable is not directly rotated but indirectly rotated. Thus, durability becomes excellent, and smooth rotation is possible.

In particular, in the power transmission underground cable winding device according to the present invention and the power transmission underground cable spreading system including same, cable drums having different specifications are also allowed to rotate smoothly. Thus, cable drums having various specifications may be utilized.

MODE FOR CARRYING OUT THE INVENTION

Hereinafter, a power transmission underground cable pulling system according to the present invention will be described with reference to the accompanying drawings.

Figure 3:
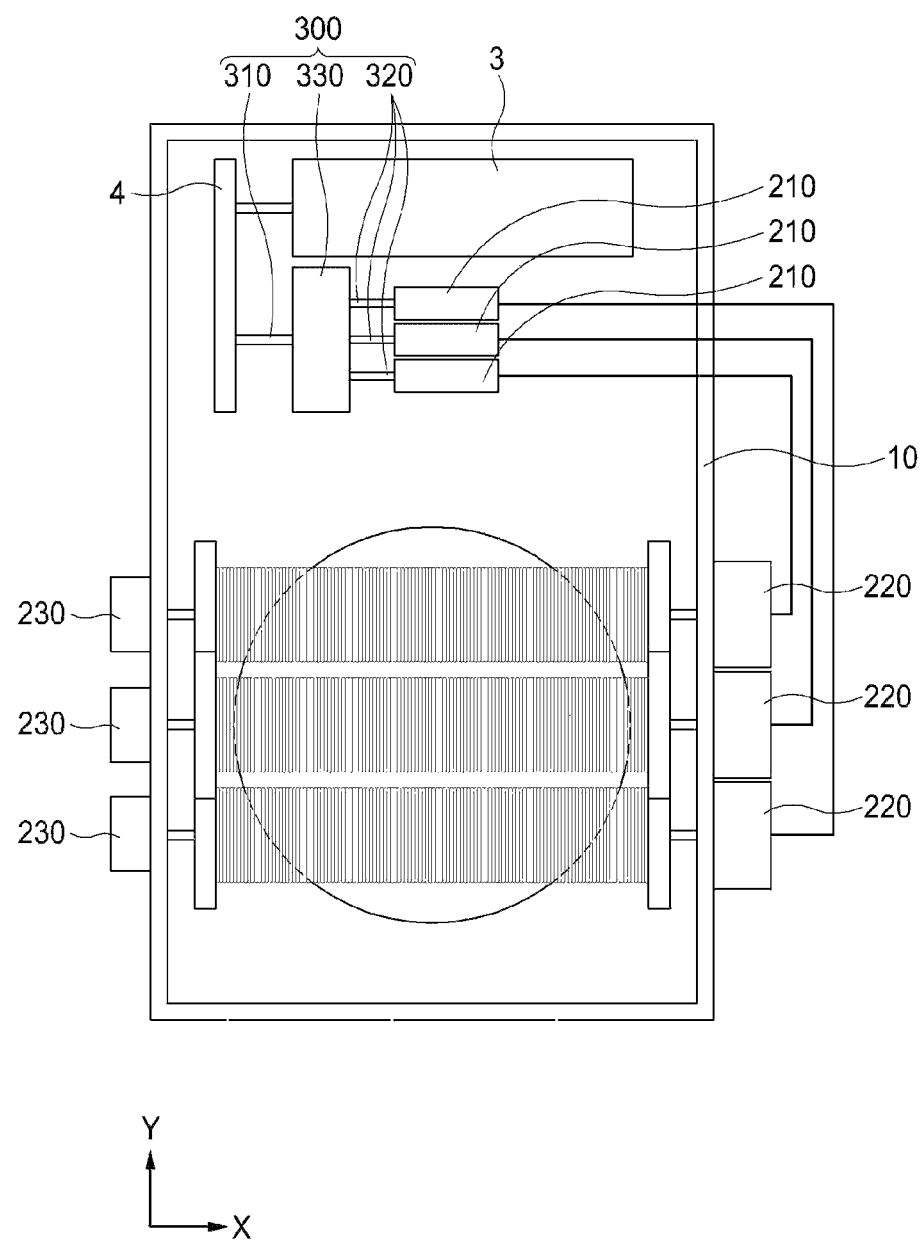
FIG. 3 is a plan view showing an installation state of a power transmission underground cable pulling system according to the present invention.
Figure 4A:
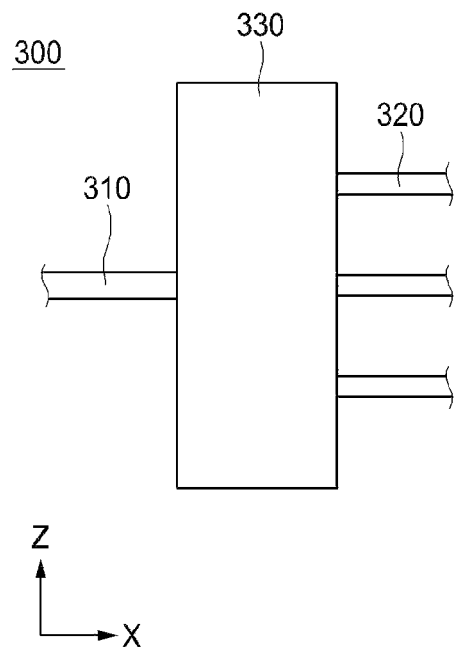
FIGS. 4A and 4B are a side view and a front view showing a state of a power distribution unit of the power transmission underground cable pulling system of FIG. 3.
Figure 4B:
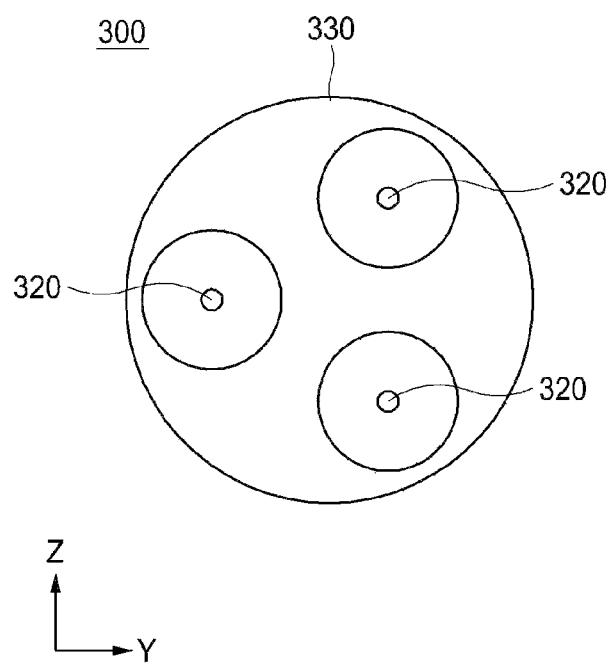

As illustrated in FIG. 3, the power transmission underground cable pulling system according to the present invention is a power transmission underground cable pulling system for pulling a power transmission three-phase underground cable which is installed under the ground, and comprises: a pair of support frames 10; a plurality of rotation shafts 110 rotatably installed across the pair of support frames 10; a drum unit 100 including a plurality of wire drums 120 which are coupled to the rotation shafts 110, wind wires 1, which are connected to cables 2, through rotation, and pull the underground cables 2; a plurality of drive units 200 which are coupled to the plurality of rotation shafts 110, respectively, and rotate the plurality of rotation shafts 110;

and a power distribution unit 300 which has one end connected to a drive source 3 and the other end connected to the plurality of drive units 200 and distributes power, which is received from the one drive source 3, to the plurality of drive units 200.

Each of the cables 2 is configured to be installed under the ground to perform power transmission and may have various configurations.

For example, as a power transmission facility for transporting electric power produced in a power plant to a substation, the cable 2 may be a large-size electric wire, through which a high-voltage current of 354 KV flows, and may be a heavy wire having the weight of 6-7 kg per 1 m.

The cable 2 may be installed under the ground to prevent a failure of power supply due to an external environment and stably supply electric power. Hereinafter, a power transmission underground cable pulling system according to the present invention will be described with reference to the accompanying drawings.

As illustrated in FIG. 3, the power transmission underground cable pulling system according to the present invention is a power transmission underground cable pulling system for pulling a power transmission three-phase underground cable which is installed under the ground, and comprises: a pair of support frames 10; a plurality of rotation shafts 110 rotatably installed across the pair of support frames 10; a drum unit 100 including a plurality of wire drums 120 which are coupled to the rotation shafts 110, wind wires 1, which are connected to cables 2, through rotation, and pull the underground cables 2; a plurality of drive units 200 which are coupled to the plurality of rotation shafts 110, respectively, and rotate the plurality of rotation shafts 110; and a power distribution unit 300 which has one end connected to a drive source 3 and the other end connected to the plurality of drive units 200 and distributes power, which is received from the one drive source 3, to the plurality of drive units 200.

Each of the cables 2 is configured to be installed under the ground to perform power transmission and may have various configurations.

For example, as a power transmission facility for transporting electric power produced in a power plant to a substation, the cable 2 may be a large-size electric wire, through which a high-voltage current of 354 KV flows, and may be a heavy wire having the weight of 6-7 kg per 1 m.

The cable 2 may be installed under the ground to prevent a failure of power supply due to an external environment and stably supply electric power, and specifically, may be installed within a conduit located under the ground or installed within an underground power tunnel.

In particular, three cables 2 may be simultaneously installed to supply three-phase electric power.

Also, in order to establish smooth connection to a wire 1 which is connected to carry the cable 2, a connection member having an end to which the wire 1 is connected may be installed on the cable 2.

The connection member is configured to facilitate connection between the wire 1 and the cable 2 and may have various configurations.

The wire 1 has one end connected to the cable 2 and the other end connected to the wire drum 120. The wire 1 is configured to be wound on the wire drum 120 to carry the cable 2 and may have various configurations.

For example, in order to carry the heavy cable 2, the wire 1 may be made of a highly durable material such as a steel-based wire rope or a fiber-based high strength rope, which is not broken or stretched even under high tensile strength and also exhibits excellent durability against friction on the bottom surface under the ground or the inclined surface of a manhole 5.

The wire 1 may be discharged to the outside of the manhole 5 by a separate guide 7 for a change to the vertical direction within the manhole 5.

The pair of support frames 10 are configured to install the drum unit 100, which will be described later, and may have various configurations.

For example, each of the support frames 10 may have a rectangular plane shape so as to be connected to a lower end of a vehicle 6 and allow the power transmission underground cable pulling system to be installed on the vehicle 6.

The drum unit 100 is configured to pull the underground cable 2 by winding the wire 1 and may have various configurations.

For example, the drum unit 100 may include a plurality of rotation shafts 110 which are rotatably installed across the pair of support frames 10 and a plurality of wire drums 120 which are coupled to the rotation shafts 110 and pull the underground cable 2 by winding the wire 1, which is connected to the cable 2, through rotation.

The rotation shafts 110 may be installed corresponding to the number of the cables 2, and three rotation shafts 110 may be installed corresponding to three cables 2 so as to supply three-phase electric power.

For example, each of the rotation shafts 110 may be installed across the support frames 10, having a rectangular plane shape, to be parallel to a short side of the support frame 10, and may be configured to be rotatably installed.

For another example, the rotation shafts 110 may be installed across the pair of support frames 10 to form a triangular shape when viewed in a side view, and accordingly, the utilization area may be reduced when a wire drum 120, which will be described later, is installed.

The rotation shaft 110 may be rotatably installed passing through the pair of support frames 10 or may be rotatably installed by being simply placed over the pair of support frames 10.

Here, for smooth rotation of the rotation shaft 110, a member such as a bearing (not shown) for enabling smooth rotation may be installed on a portion of the rotation shaft 110 at which the support frames 10 are installed.

The wire drum 120 may be coupled to the rotation shaft 110 and pull the underground cable 2 by winding the wire 1, which is connected to the cable 2, through rotation.

For example, three wire drums 120 may be coupled and installed on three rotation shafts 110, respectively, and in this state, the installation positions thereof may be adjusted so that the wires 1 wound through the rotation are not tangled with each other.

In more detail, the three wire drums 120 may be installed on the three rotation shafts 110, which form a triangular shape when viewed from a side view, while being spaced apart from each other, and thus may be installed to form a triangular shape when viewed from the side view. Accordingly, the positions, at which the wires 1 respectively connected to the wire drums 120, are spaced apart from each other, and thus the three wires 1 may be wound without interference with each other.

Also, hooks may be formed on both ends of the wire drum 120 to prevent the wound wire 1 from being unwound.

The drive units 200 are configured to be coupled to the plurality of rotation shafts 110, respectively, to rotate the plurality of rotation shafts 110 and may have various configurations.

For example, each of the drive units 200 converts mechanical energy, which is received through the power distribution unit 300, into hydraulic energy, and the rotation shaft 110 may be rotated by the hydraulic energy.

Here, three drive units 200 are provided to drive the plurality of wire drums 120, respectively, and each of the drive units drives the wire drum 120 through the hydraulic energy. Thus, the speed of each of the three wire drums 120 may be precisely controlled, and overall carrying operation for the three cables 2 may be precisely controlled.

In more detail, the drive units 200 may include a plurality of hydraulic motors 220 which are coupled to ends of the rotation shafts 110 to rotate the rotation shafts 110 and a plurality of hydraulic pumps 210 which convert the mechanical energy, which are received from the power distribution unit 300, into the hydraulic energy and drive the hydraulic motors 220 by using the hydraulic energy.

Furthermore, the drive units 200 may further include brake parts 230 which are respectively coupled to ends of the plurality of rotation shafts 110 and reduce rotation speeds of the plurality of rotation shafts 110.

The hydraulic motors 220 are configured to rotate the rotation shafts 110 and may have various configurations.

For example, the hydraulic motors 220 are installed corresponding to the number of the rotation shafts 110, respectively, and three hydraulic motors 220 may be installed to simultaneously carry three cables 2, respectively, for three-phase electric power supply.

The hydraulic motors 220 may generate power as operation shafts are rotated by high-pressure fluids generated through the hydraulic pumps 210, and the hydraulic motors 220 may have any configuration as long as they are commercially used.

The hydraulic motors 220 are connected to the rotation shafts 110 by using pulleys and belts, and driving force may be amplified to rotate the rotation shafts 110.

The hydraulic motors 220 are configured to convert the mechanical energy, which is received through the power distribution unit 300, into the hydraulic energy, and may have any configuration as long as they discharge the high-pressure fluids to the hydraulic motors 220 by using the received mechanical energy and drive the hydraulic motors 220.

For example, any pump such as a gear pump, a vane pump, or a piston pump may be used as the hydraulic pump 210, and the power thereof may be at least 10 tons, and more preferably, 20 tons (196 KN) so as to carry 400 m of the cable 2 having the weight of 6-7 kg per 1 m.

The brake parts 230 are configured to be coupled to the ends of the plurality of rotation shafts 110, respectively, to reduce the rotation speeds of the rotation shafts 110, and may have various configurations.

For example, the brake parts 230 are installed at ends of the rotation shafts 110 on the opposite side where the hydraulic motors 220 are installed and thus may decelerate the rotation of the rotation shafts 110. All of mechanical brakes and hydraulic brakes are possible.

Also, the power transmission cable 2 is a large-size heavy cable, and thus driving power satisfying three hydraulic pumps 210 may not be discharged only by using one hydraulic source. Accordingly, separate three hydraulic sources have to be installed corresponding to the number of the hydraulic pumps 210.

Thus, the power transmission underground cable pulling system according to the present invention includes a power distribution unit 300 which is configured to divide and transfer the power, which is generated through a separate drive source 3, to the three hydraulic pumps 210.

The power distribution unit 300 has one end connected to the drive source 3 and the other end connected to the plurality of drive units 200. The power distribution unit 300 is configured to distribute power, which is received from the one drive source 3, to the plurality of drive units 200 and may have various configurations.

For example, the power distribution unit 300 may include an input part 310 connected to the drive source 3 to receive power from the drive source 3 and a plurality of output parts 320 connected to the input part 310 so as to divide the power, which is input through the input part 310, and output the power to the drive units 200.

Also, the power distribution unit 300 may include a case 330 that forms an inner space in which an input gear of the input part 310 and output gears of output parts 320 are installed and engaged with each other.

The input part 310 is configured to receive the power from the drive source 3, and may include an input shaft to which the power is input and an input gear connected to the input shaft.

The plurality of output parts 320 may include a plurality of output gears engaging with the input gear and a plurality of output shafts which are coupled to the output gears, respectively, to output the power and connected to the hydraulic pumps 210, respectively.

The power transmission underground cable pulling system according to the present invention may include a power transmission unit for transmitting the power from the drive source 3 to the power distribution unit 300, and the power transmission unit may have any configuration as long as it transmits the power of the drive source 3 to the input part 310 of the power distribution unit 300.

For example, the power transmission unit may be a V belt 4 or a chain and transmit the power as one end thereof is coupled to the drive source 3 while the other end is coupled to the input part 310.

Also, the power transmission underground cable pulling system according to the present invention is equipped with the three wires 1 connected to the three cables 2, respectively, so as to supply the three-phase electric power. The wires 1 may be tangled during the pulling operation, or the center of gravity of the wire drum 120 may be moved as the wire 1 is not uniformly wound on the wire drum 120.

Figure 5:
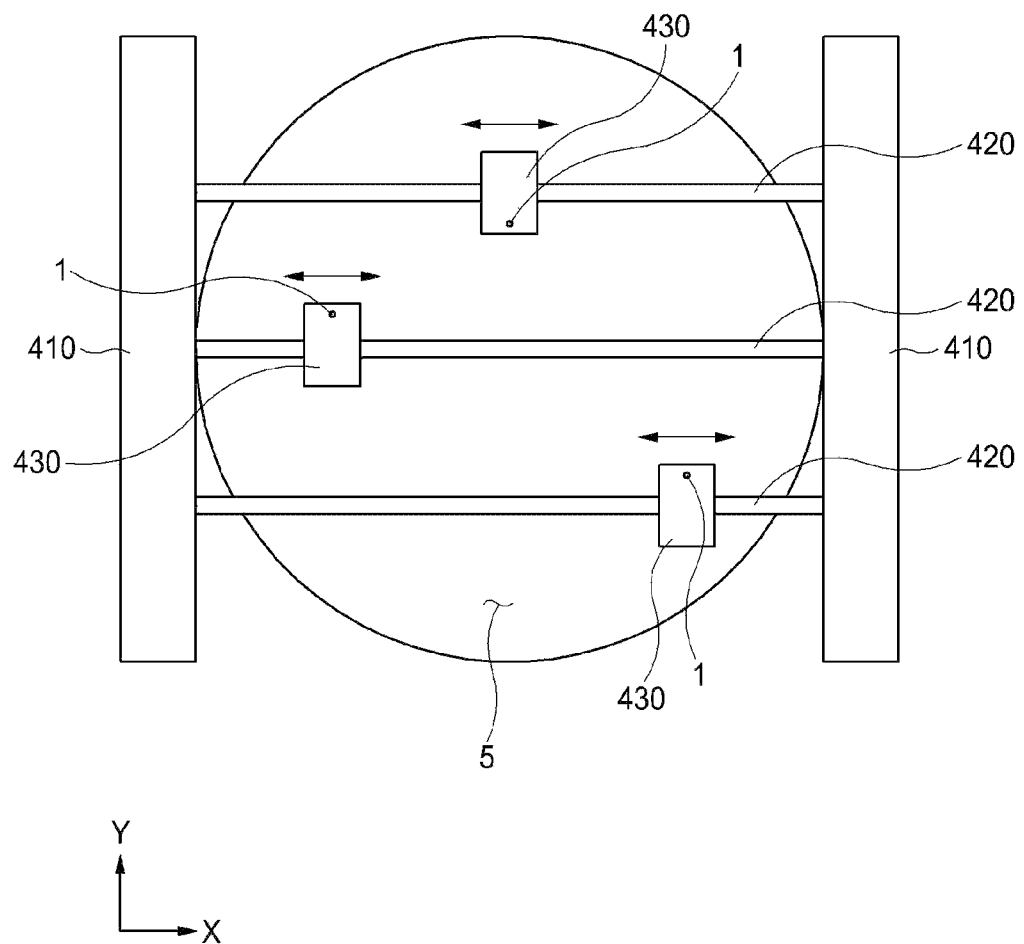
FIG. 5 is a plan view showing a state of a winding guide unit of the power transmission underground cable pulling system of FIG. 3.
Figure 6:
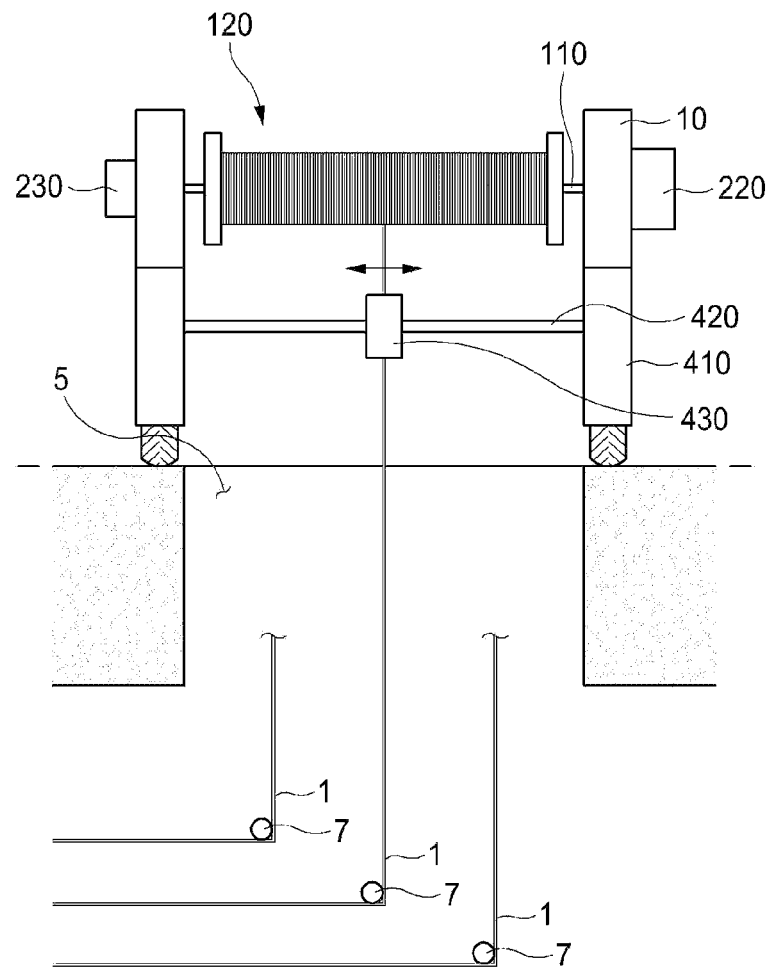
FIG. 6 is a side view showing a state of a winding guide unit of the power transmission underground cable pulling system of FIG. 3.
Figure 7:
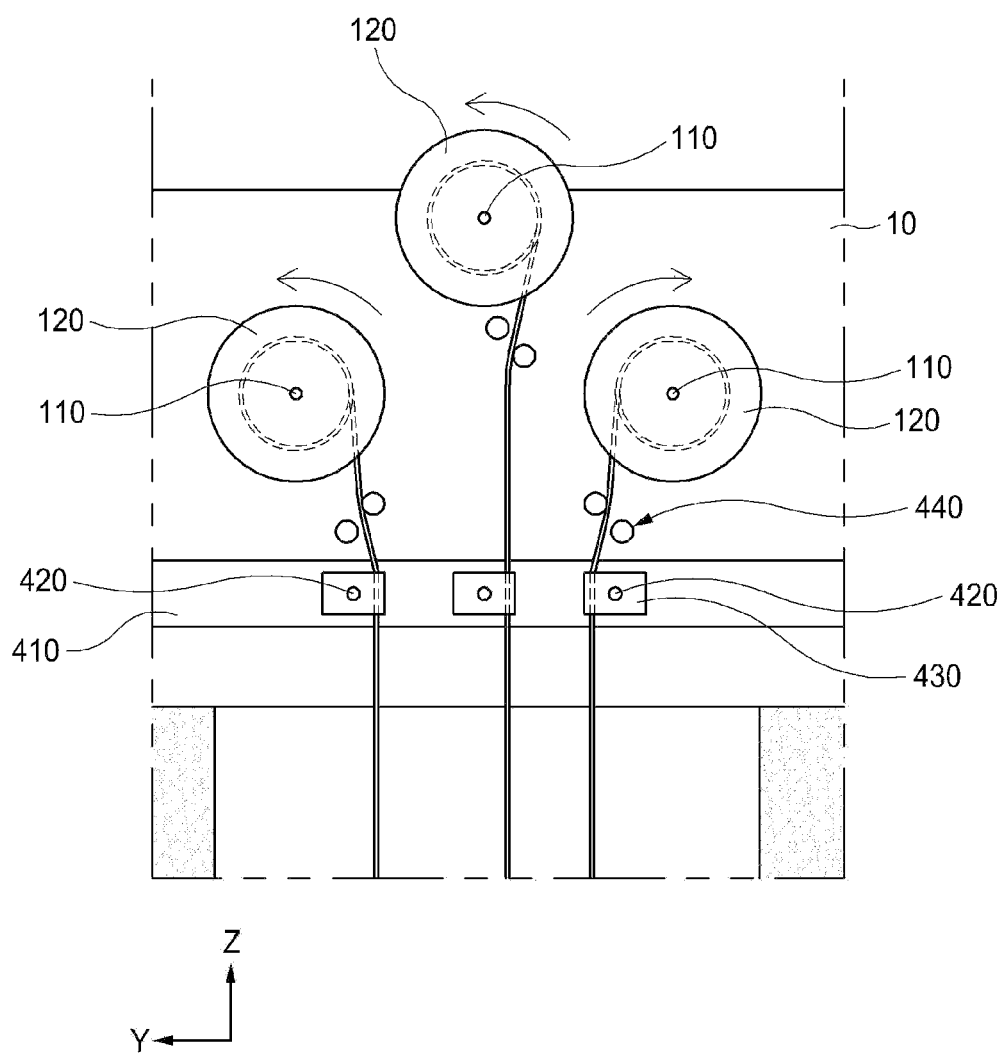
FIG. 7 is a side view showing a state of the power transmission underground cable pulling system of FIG. 3.

Thus, as illustrated in FIGS. 5 and 6, the power transmission underground cable pulling system according to the present invention may include a plurality of winding guide units 400 through which the wires 1 pass through and which move in the left-right direction to guide the wires 1 so that the wires 1 are uniformly wound on the wire drums 120.

Each of the winding guide units 400 is configured to guide the wire 1 with respect to the wire drum 120 so that the wire 1 is uniformly wound on the wire drum 120, and may have various configurations.

For example, the winding guide units 400 may include three shaft part 420 which are installed across the pair of support frames 10 and three guide rollers 430 which are installed on the three shaft parts 420 so as to be movable in the left-right direction and through which the three wires 1 pass respectively.

Also, for another example, the winding guide unit 400 include a pair of winding guide frames 410 which are installed below the pair of support frames 10, respectively. The three shaft parts 420 are installed on the pair of winding guide frames 410, and the three guide rollers 430, through which the three wires 1 pass, may move in the left-right direction.

The winding guide unit 400 may further include a roller part 440 which is positioned above the shaft part 420 and the guide roller 430 to guide a path of the wire 1 so that the wire 1 is discharged from the manhole 5 and arrives at the wire drum 120 in a certain direction.

The pair of winding guide frames 410 are configured to be installed spaced apart from each other such that the shaft part 420 is installed to move the guide roller 430 in the left-right direction, and may have various configurations.

For example, the pair of winding guide frames 410 may be installed on two edge portions of the manhole 5 on the ground, which corresponds to the installation position of the winding guide unit 400 and through which the wire 1 is discharged from under the ground. For another example, the pair of winding guide frames 410 may be installed below the support frames 10.

The shaft part 420 is installed across the pair of the winding guide frames 410 spaced apart from each other. The shaft part 420 is configured to install the guide roller 430 for guiding the wire 1, and may have various configurations.

For example, corresponding to the number of wires 1, three shaft parts 420 may be spaced apart from each other and installed above the manhole 5.

The guide roller 430 is installed to the shaft part 420 so as to be movable in the left-right direction, and the wire 1 is installed passing therethrough. The guide roller 430 is configured to guide the wire 1, and may have various configurations.

Thus, the guide roller 430 may move along the shaft part 420 in the left-right direction so that the wire 1 is uniformly wound on the wire drum 120, and a separate drive unit may be additionally installed to drive the left-right movement.

The guide roller 430 may be moved in the left-right direction, without the separate drive unit, by force generated while the wire 1 is uniformly wound on the wire drum 120.

The roller part 440 is configured to guide the path of the wire 1 so that the three wires 1 arrive at the wire drums 120 in the certain direction without interference after being guided and discharged from the manhole 5 through the guide roller 430. The roller part 440 may have various configurations.

As illustrated in FIG. 6, a pair of rollers of the roller part 440 is installed above the guide roller 430 for one wire drum 120, and interference between the wires 1 may be prevented by allowing the wire 1 to pass through between the pair of rollers.

That is, the roller part 440 prevents the wire 1 from moving toward an irrelevant wire drum 120 so that the three wires 1 are moved, without interference, to the respective wire drums 120 on which the wires 1 are to be wound. Thus, the paths of the wires 1 may be guided while preventing the wires 1 from being tangled.

Also, according to the power transmission underground cable pulling system of the present invention, the vehicle 6 stops such that the pair of support frames 10 installed below the vehicle 6 is located above the manhole 5 through which the three wires 1 are discharged, and the plurality of wires 1 may be guided and vertically moved through the winding guide unit 400 and wound on the wire drums 120, respectively.

Also, a power transmission operation of the power transmission underground cable pulling system according to the present invention will be described.

Figure 1:
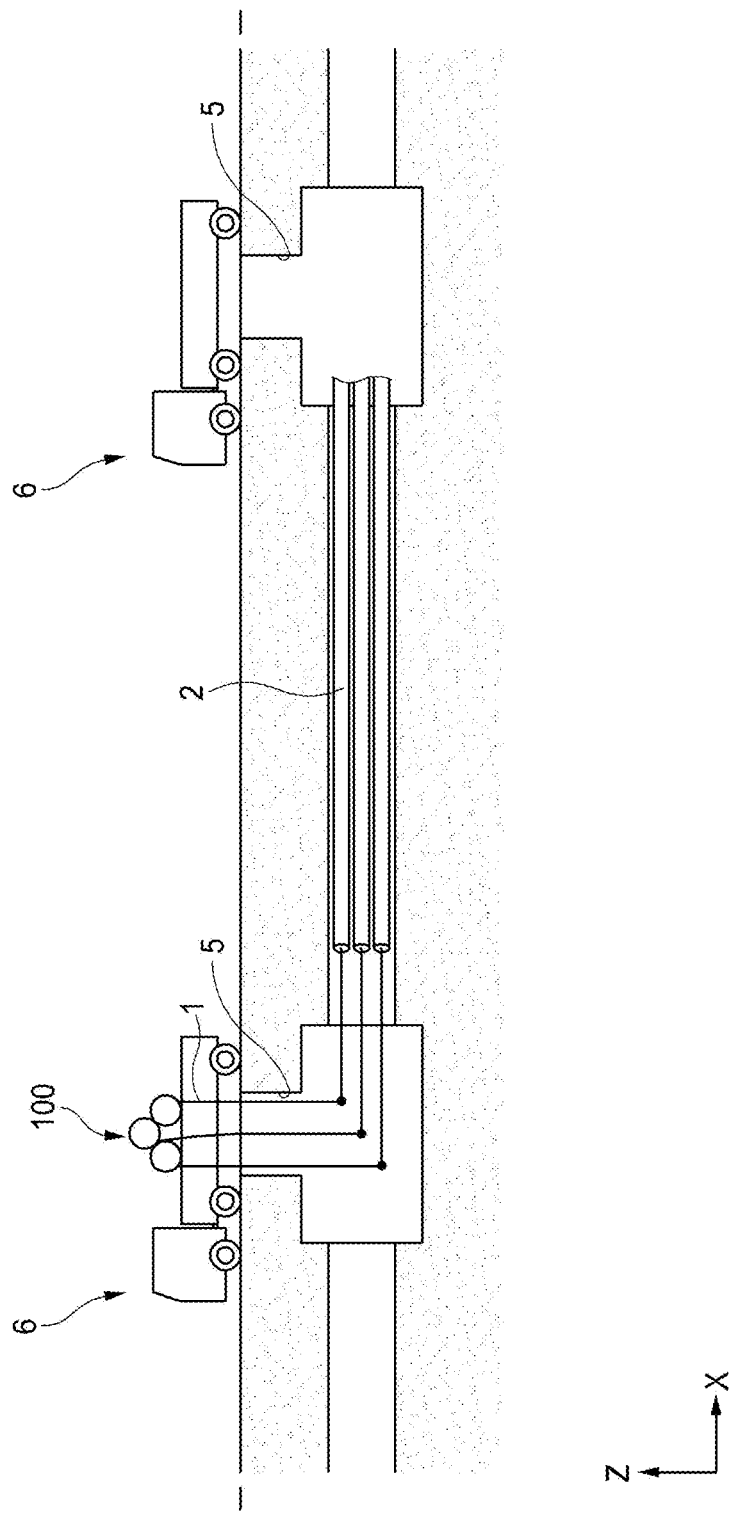
FIG. 1 is a schematic view showing a power transmission underground cable pulling system according to the present invention.
Figure 2:
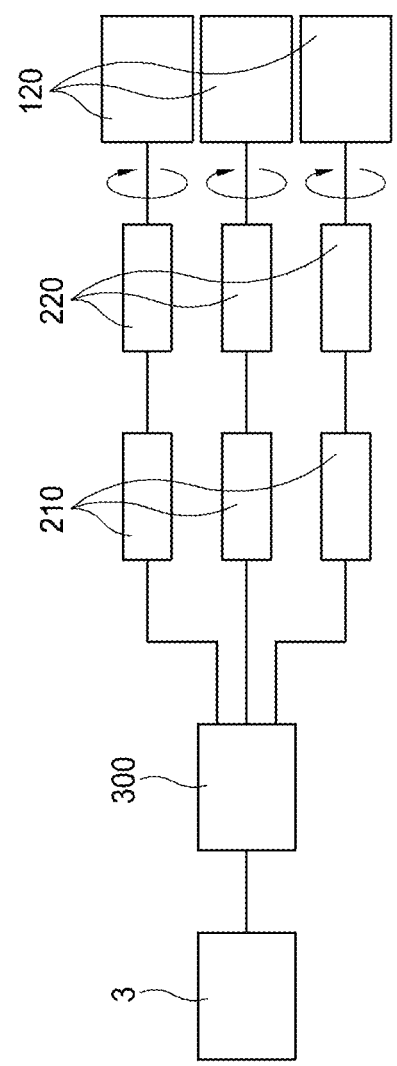
FIG. 2 is a block diagram showing an installation structure of the power transmission underground cable pulling system of FIG. 1.

As illustrated in FIG. 2, in the power transmission underground cable pulling system according to the present invention, the power of the drive source 3 as the mechanical energy is transmitted to the power distribution unit 300 through the power transmission unit, and the power received through the input part 310 may be output through the three output parts 320.

When the power is output through the three output parts 320, the mechanical energy is converted into the hydraulic energy through the hydraulic pumps 210 connected to the output parts 320, respectively. Then, the high-pressure fluids may be transmitted to the hydraulic motors 220 to drive the hydraulic motors 220.

When the wire drum 120 is rotated by the rotation of the rotation shaft 110 according to the rotation of the hydraulic motor 220, the underground cable 2 may be carried as the wire 1 having one end connected to the wire drum 120 and the other end coupled to the underground cable 2 is wound.

Here, in order to pull each of three of three-phase power transmission cables 2, three rotation shafts 110, three wire drums 120, three drive units 200, and three output parts 320 are provided corresponding to the cables 2.

Hereinafter, a power transmission underground cable winding device according to the present invention and a power transmission underground cable spreading system including same will be described with reference to the accompanying drawings.

Figure 8:
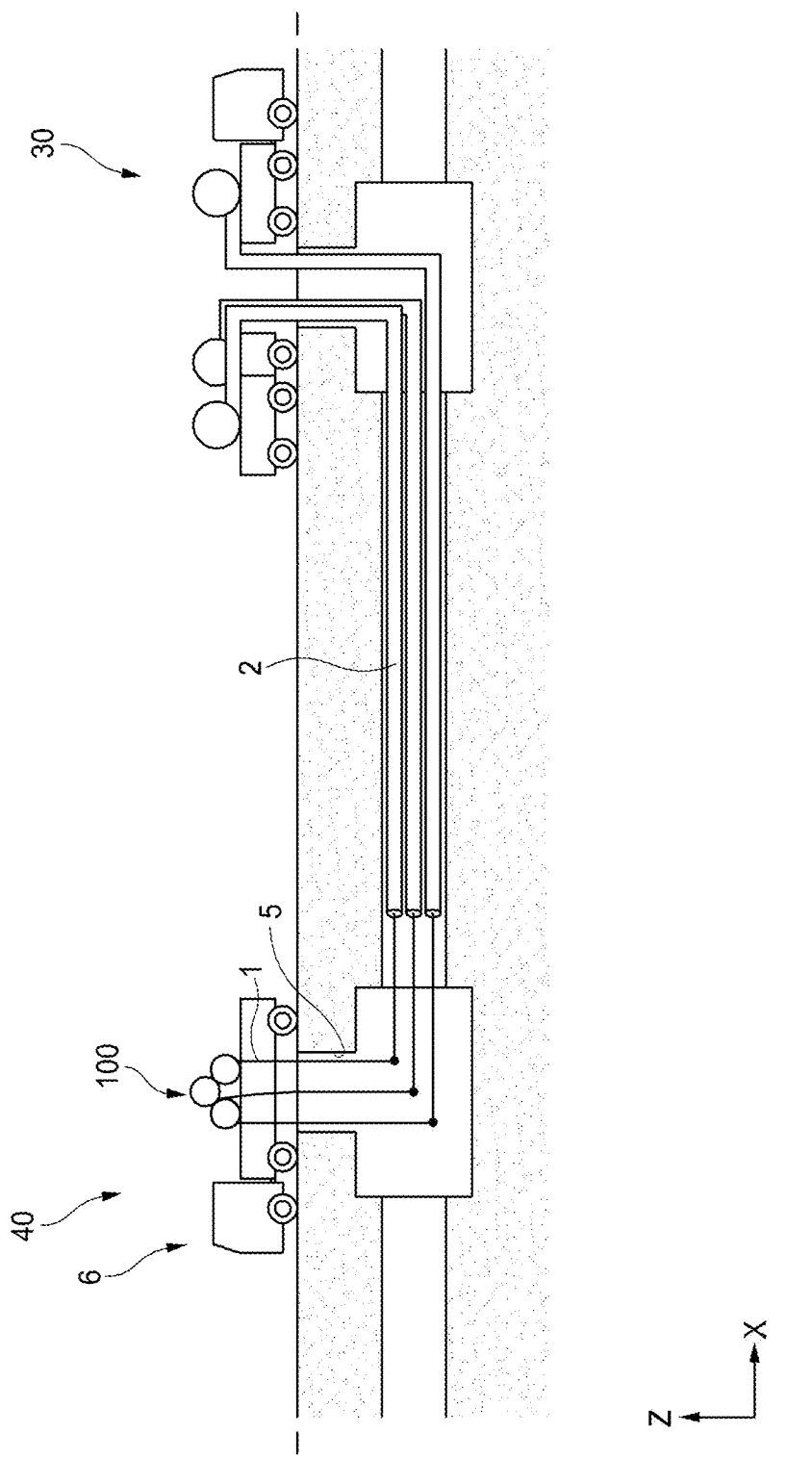
FIG. 8 is a schematic view showing a power transmission underground cable spreading system according to the present invention.

As illustrated in FIG. 8, disclosed in the present invention is a power transmission underground cable winding device for winding a power transmission underground cable installed under the ground, the power transmission underground cable winding device including: a base 20; a pair of support units 800 installed spaced apart from each other on the base 20; a cable drum unit 600 which is spaced apart from the base 20 and supported by the pair of support units 800, and unwinds a power transmission cable 2, which has been wound, or winds and collects the same through rotation; and a cable drum drive unit 700 for rotating the cable drum unit 600.

The cable drum unit 600 may include: a rotation shaft 610 installed across the pair of the support units 800; a winding part 620 coupled to the rotation shaft 610 and unwinding the power transmission cable 2, which has been wound, or winding and collecting the same through rotation; and a partition wall part 630 expanding from at least one end of the winding part 620 in a direction perpendicular to the rotation shaft 610.

The cable drum drive unit 700 may be installed to interfere with the partition wall part 630, rotate the partition wall part 630 through rotation in an interference state, and rotate the cable drum unit 600 about the rotation shaft 610.

Here, as described above, the power transmission underground cable according to the present invention is configured to be installed under the ground for the power transmission, and may have various configurations.

For example, as a power transmission facility for transporting electric power produced in a power plant to a substation, the cable 2 may be a large-size electric wire, through which a high-voltage current of 354 KV flows, and may be a heavy wire having the weight of 6-7 kg per 1 m.

The cable 2 may be installed under the ground to prevent a failure of power supply due to an external environment and stably supply electric power, and specifically, may be installed within a conduit located under the ground or installed within an underground power tunnel.

That is, the cable 2 is carried in a state of being wound on the cable drum unit 600 for installation on a new region and removal and replacement of an existing cable. Then, the cable 2 may be provided as being unwound from the cable drum unit 600. In this case, the cable spreading system may be configured by pulling the cable 2 at the other end through the power transmission underground cable pulling system described above.

The cable spreading system will be described later in detail.

Here, in a case for removing a cable installed in an existing region, one end of an existing cable 2 is connected to the cable drum unit 600 on which the cable 2 is not wound, and the cable 2 is wound by rotating the cable drum unit 600, thereby removing the cable 2.

The base 20 is configured to provide a location at which the pair of support units 800 are installed, and may have various configurations.

For example, as illustrated in FIG. 8, the base 20 may be a plate or a surface plate having a flat top surface and installed in a cargo bed of a vehicle. Since the base 20 is provided in the vehicle, the power transmission cable winding device according to the present invention may easily arrive at an installation location for the power transmission cable.

The pair of support units 800, which will be described later, may be installed on the top surface of the base 20, and furthermore, the cable drum unit 600 and the cable drum drive unit 700 may be installed thereon.

In particular, a groove portion 21 corresponding to a lower rotation part 730 of a lower cable drum drive part 710, which will be described later, may be formed in the top surface of the base 20 such that the lower rotation part 730 can rotate without interference with the base 20 while being in close contact with the partition wall part 630.

The groove portion 21 is formed in the top surface of the base 20, and at least a portion of the lower rotation part 730 is inserted therein. The groove portion 21 is configured to prevent interference with the base 20 when the lower rotation part 730 rotates, and may have various configurations.

Here, taking into consideration horizontal movement on the top surface of the base 20 through a lower arm part 740 of the lower rotation part 730, the groove portion 21 may be formed corresponding to a movement range of the lower rotation part 730 that linearly moves through the lower arm part 740.

That is, when viewed in a plan view, the groove portion 21 may be formed from a max forward position, on a side of the cable drum unit 600 with respect to the lower rotation part 730, to a max backward position on the opposite side from the cable drum unit 600.

Accordingly, the groove portion 21 may prevent the lower rotation part 730 from interfering with the top surface of the base 20 even though the lower cable drum drive part 710 moves linearly.

The pair of support units 800 are configured to be installed on the top surface of the base 20 and spaced apart from each other, and may have various configurations.

For example, the pair of support units 800 are configured to be installed on the top surface of the base 20 and spaced apart from each other, thereby separating the cable drum unit 600 from the base 20 and supporting the cable drum unit 600. The pair of support units 800 may include a rotation shaft support part 810 for rotatably supporting the rotation shaft 610 and a vertical drive part 820 provided below the rotation shaft support part 810 to drive the rotation shaft support part 810 in the up-down direction.

Also, the pair of support units 800 may further include: a lower support body 830 for supporting the rotation shaft support part 810 and distributing and supporting the weight of the cable drum unit 600; and a bearing (not shown) installed such that the rotation shaft 610 smoothly rotates while being installed on the rotation shaft support part 810.

The rotation shaft support part 810 is installed on the vertical drive part 820 installed above the base 20. The rotation shaft support part 810 is configured to support the rotation shaft 610, and may have various configurations.

For example, the rotation shaft support part 810 has a semicircular shape so that the rotation shaft 610 is smoothly rotates while being supported, and may be configured to contact and support the lower side surface of the rotation shaft 610.

Also, for another example, the rotation shaft support part 810 may be configured to support the rotation shaft 610 in a manner in which both ends of the rotation shaft 610 are inserted and coupled. In this case, circular through-holes are formed facing each other, and the rotation shaft 610 may be inserted and installed.

The vertical drive part 820 is provided below the rotation shaft support part 810. The vertical drive part 820 is configured to drive the rotation shaft support part 810 in the up-down direction, and may have various configurations.

For example, the vertical drive part 820 may be a hydraulic cylinder which is installed perpendicular to the base 20 below the rotation shaft support part 810 so that the rotation shaft support part 810 moves in the up-down direction.

That is, the vertical drive part 820 may include: a hydraulic drive source 821 for moving the rotation shaft support part 810 in the up-down direction through hydraulic pressure; and a hydraulic cylinder part 822 which has one end connected to the hydraulic drive source 821 and the other end connected to the rotation shaft support part 810 and transmits driving force of the hydraulic drive source 821 to the rotation shaft support part 810.

The vertical drive part 820 may adjust an installation position of the cable drum unit 600 by moving the rotation shaft support part 810 in the up-down direction, and accordingly, common installation and use of the cable drum units 600 having different specifications are possible.

That is, when a cable drum unit 600 having a relatively large specification is installed, a lower end of the cable drum unit 600 including the rotation shaft 610 may be prevented from interfering with the base 20 by moving the rotation shaft support part 810 upward. On the contrary, when a cable drum unit 600 having a relatively small specification is installed, a lower end of the cable drum unit 600 including the rotation shaft 610 may be adjusted to come into close contact with a cable drum drive unit 700, which will be described later, by moving the rotation shaft support part 810 downward.

Furthermore, the vertical drive part 820 may adjust the level of the cable drum unit 600 by moving the rotation shaft support part 810 in the up-down direction. Thus, a crane for carrying the cable drum unit 600 when the cable drum unit 600 is installed and removed may easily approach.

In more particular, the vertical drive part 820 raises the rotation shaft support part 810 to the maximum height when the cable drum unit 600 is installed and removed. Thus, the crane for carrying the cable drum unit 600 easily approaches, and the cable drum unit 600 may be placed at a right position of the pair of the support units 800.

Here, the vertical drive part 820 may have any configuration as long as it may drive the rotation shaft support part 810 in the up-down direction through not only hydraulic divining but also electric and magnetic driving disclosed according to the related art.

The lower support body 830 is configured to distribute and support the weight of the cable drum unit 600 by supporting the rotation shaft support part 810, and may have various configurations.

For example, the lower support body 830 may have a through-hole, through which the vertical drive part 820 may be driven, and may distribute and support the weight of the cable drum unit 600 by supporting the rotation shaft support part 810 according to the height adjustment of the vertical drive part 820.

To this end, the lower support body 830 is installed on the top surface of the base 20 and may be formed in a structure in which an area on a plane is gradually increased downward.

The bearing (not shown) is configured to be installed such that the rotation shaft 610 is smoothly rotated while being installed on the rotation shaft support part 810, and may have various configurations.

The cable drum unit 600 is installed apart from the base 20 through the pair of the support units 800. The cable drum unit 600 is configured to unwind, or wind and collect the power transmission cable 2 through rotation, and may have various configurations.

For example, the cable drum unit 600 may include: a rotation shaft 610 installed across the pair of the support units 800; a winding part 620 coupled to the rotation shaft 610 and unwinding the power transmission cable 2, which has been wound, or winding and collecting the same through rotation; and a partition wall part 630 expanding from at least one end of the winding part 620 in a direction perpendicular to the rotation shaft 610.

The rotation shaft 610 is configured to be rotatably installed across the pair of the support units 800, and may have various configurations.

For example, the rotation shaft 610 is coupled to the winding part 620 and the partition wall part 630 by passing through a through-hole that pass through the winding part 620 and the partition wall part 630, and thus the rotation shaft 610 may rotate integrally with the winding part 620 and the partition wall part 630.

Here, the rotation shaft 610 is configured to not only rotate the winding part 620 and the partition wall part 630 but also separate the winding part 620 and the partition wall part 630 from the base 20 and support the same. Thus, the rotation shaft 610 may be made of material having excellent durability and strength so as to support high weight.

The winding part 620 is coupled to the rotation shaft 610. The winding part 620 is configured to unwind the power transmission cable 2, which has been wound, or wind and collect the same through rotation.

For example, in a state in which the winding part 620 is coupled to the rotation shaft 610 as the rotation shaft 610 passes therethrough, the winding part 620 is rotated by the rotation of the rotation shaft 610. Thus, the wound power transmission cable 2 may be unwound, or the installed power transmission cable 2 may be wound and collected.

In this case, as in the wire drum 120 described above, hooks may be formed on both ends of the winding part 620 to prevent the wound cable 2 from being unwound. A winding guide (not shown) for guiding the position of the cable 2 to be wound may be provided so that the cable 2 is neatly wound.

In this case, the winding guide reciprocates in the longitudinal direction of the winding part 620 according to the rotation of the winding part 620 and thus may guide the cable 2 so that cable 2 is wound neatly on the winding part 620.

The partition wall part 630 is configured to expand from at least one end of the winding part 620 in a direction perpendicular to the rotation shaft 610, and may have various configurations.

For example, the partition wall part 630 is formed by expanding from at least one end of the winding part 620 in a radial direction of the winding part 620, and thus the cable 2 wound on the winding part 620 may be prevented from moving out.

Also, the partition wall part 630 is rotated by the rotation of the cable drum drive unit 700 in a state of interfering with the cable drum drive unit 700 which will be described later, and thus, the rotation of the winding part 620 may be induced to unwound or wind the cable 2.

Here, the partition wall part 630 is indirectly rotated through the rotation of the cable drum drive unit 700 instead of rotation by direct power source. For this, the interference with the cable drum drive unit 700 is important.

For example, the partition wall part 630 may include a circumferential surface 631, which comes into close contact with the cable drum drive unit 700, so that the partition wall part 630 is rotated through the interference according to the rotation of the cable drum drive unit 700.

That is, the partition wall part 630 has the circumferential surface 631 which is outermost with respect to the rotation shaft 610 and thus may come into close contact with the cable drum drive unit 700. In this case, the circumferential surface 631 may be configured by coating, attaching, or coupling a rubber material which has a high friction coefficient and increases friction force on the cable drum drive unit 700.

That is, through an increase in adhesion force with the cable drum drive unit 700, more particularly, with a lower rotation part 730 and an upper rotation part 760 which will be described later, the circumferential surface 631 may be rotated by the rotation of the lower rotation part 730 and the upper rotation part (760).

Also, for another example, a plurality of groove 632 engaging with the cable drum drive unit 700 may be formed in the circumferential surface 631 so that the partition wall part 630 rotates while engaging with the cable drum drive unit 700.

Figure 13:
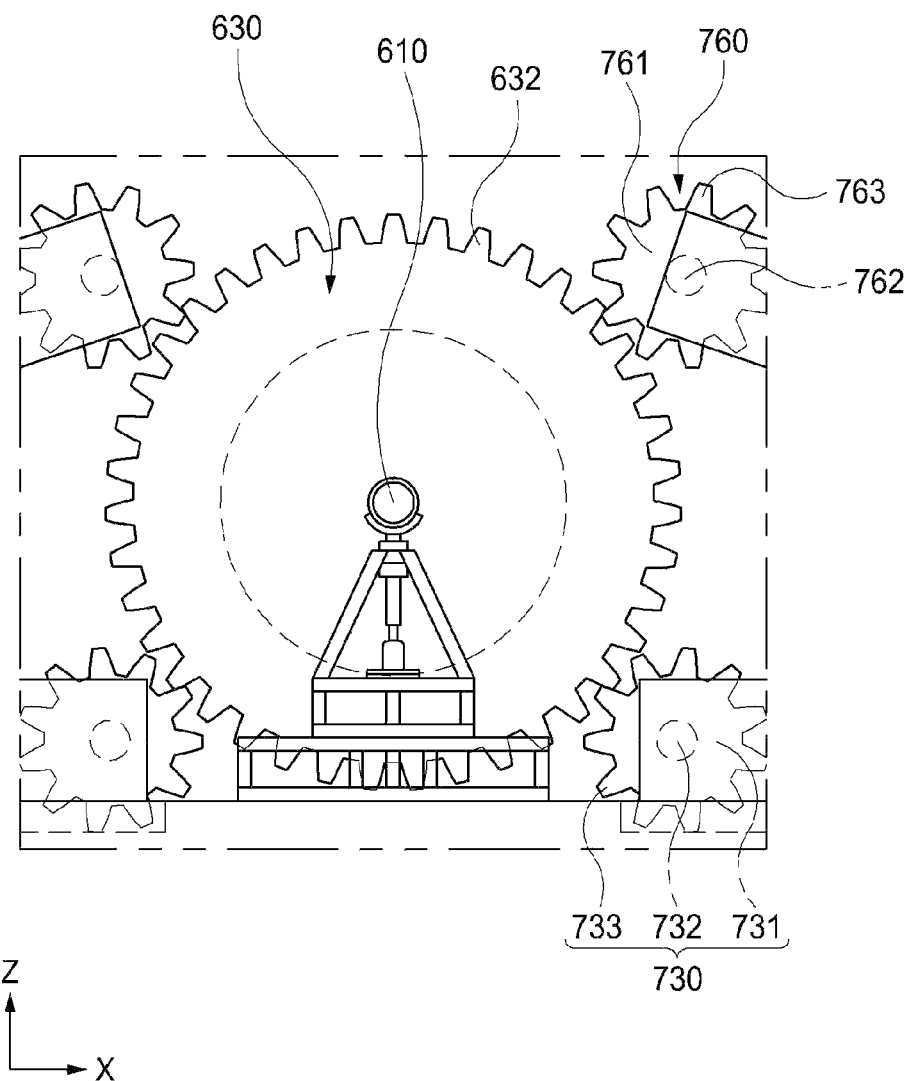
FIG. 13 is an enlarged view showing another example of a partition wall part of the power transmission underground cable winding device of FIG. 9.

In more particular, as illustrated in FIG. 13, the partition wall part 630 may have a plurality of grooves 632 which engage with lower protrusion portions 733 and upper protrusion portions 763 respectively formed on the outer circumferential surfaces of the lower rotation part 730 and the upper rotation part 760 which will be described later. The partition wall part 630 may be rotated by the interference between the lower protrusion portions 733, the upper protrusion portions 763, and the plurality of grooves 632.

Also, for another example, groove portions or protrusion portions are formed in both end surfaces of the cable drum drive unit 700. The partition wall part 630 may be configured to be installed adjacent to both ends of the cable drum drive unit 700 and rotate while interfering with the rotation of the cable drum drive unit 700.

The cable drum drive unit 700 is installed to interfere with the partition wall part 630 and rotates the partition wall part 630 through rotation in an interference state. The cable drum drive unit 700 is configured to rotate the cable drum unit 600 about the rotation shaft 610, and may have various configurations.

For example, the cable drum drive unit 700 may include at least one of a lower cable drum drive part 710 which rotates, while interfering with the partition wall part 630, below the center of the partition wall part 630 or an upper cable drum drive part 720 which rotates, while interfering with the partition wall part 630, above the center of the partition wall part 630.

In this case, as illustrated in FIGS. 9 to 12, four upper cable drum drive parts 720 and four lower cable drum drive parts 710 are installed for one cable drum unit 600 in the cable drum drive unit 700, and the cable drum unit 600 may be driven through the synchronized rotation thereof.

In more particular, the lower cable drum drive part 710 of the cable drum drive unit 700 may be installed between the pair of partition wall parts 630 provided on the base 20 and both ends, and the four lower cable drum drive parts 710 may be installed symmetrical to each other with respect to the rotation shaft 610.

Similar to the lower cable drum drive parts 710, the upper cable drum drive parts 720 may be installed, between the pair of partition wall parts 630, so as to be adjacent to each other and perpendicular to the longitudinal direction of the rotation shaft 610. The four upper cable drum drive parts 720 may be installed symmetrical to each other with respect to the rotation shaft 610.

During this operation, in order to smoothly rotate the cable drum unit 600, the rotation direction and speed of the cable drum drive unit 700 may be adjusted or controlled to correspond to the rotation direction of the cable drum unit 600.

Figure 12:
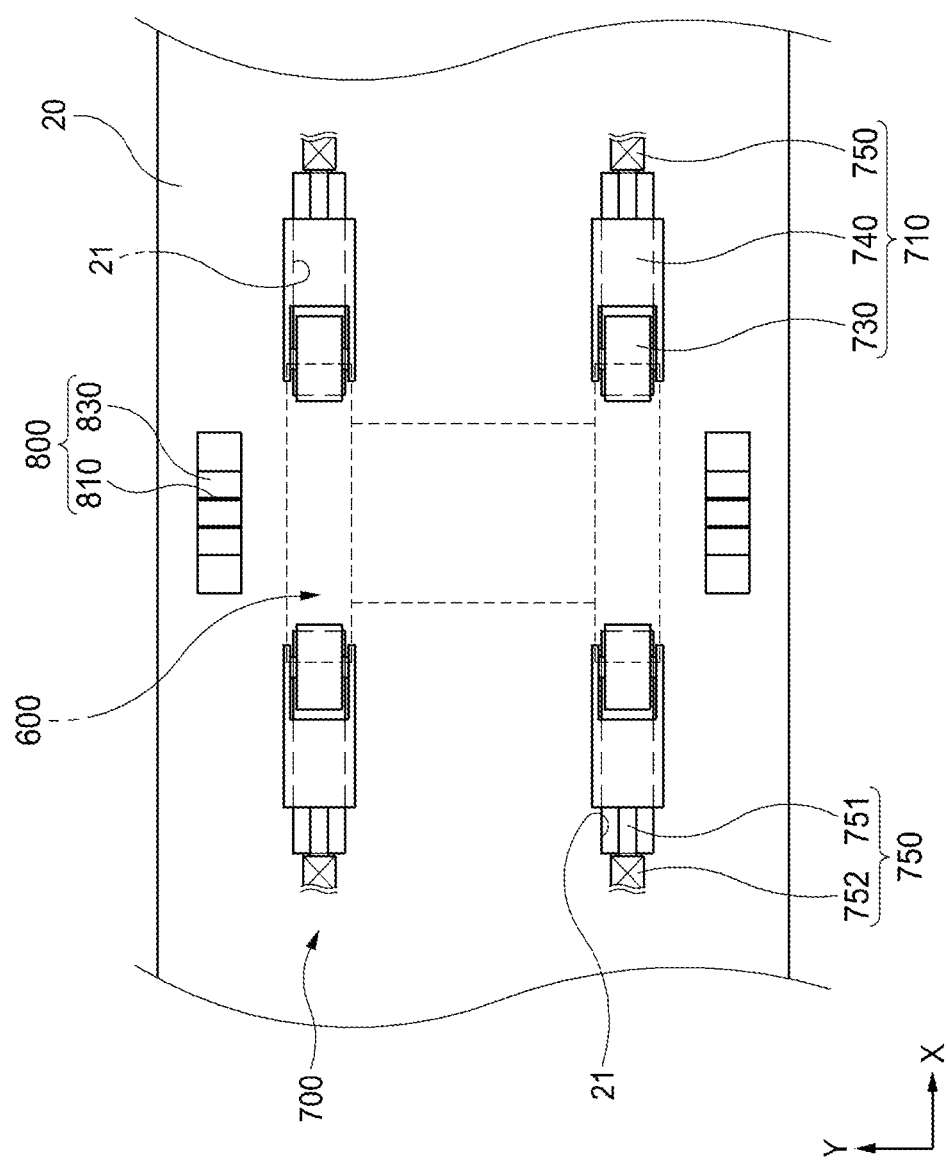
FIG. 12 is a plan view showing a state of removing a cable drum from the power transmission underground cable winding device of FIG. 9.

As illustrated in FIG. 12, the lower cable drum drive part 710 may include a lower rotation part 730 rotating in close contact with the partition wall part 630, a lower rotation part-driving part driven to rotate the lower rotation part 730, and a lower arm part 740 having one end to which the lower rotation part 730 is rotatably installed and the other end installed on the base 20.

Also, the lower cable drum drive part 710 may further include a lower arm part-driving part 750 which linearly drives the lower arm part 740 toward the partition wall part 630 for close contact with the partition wall part 630 in a state in which the cable drum unit 600 is supported by the pair of the support units 800.

The lower rotation part 730 is configured to rotate in close contact with the partition wall part 630, and may have various configurations.

For example, the lower rotation part 730 may include: a lower rotation body 731 which comes into close contact with the partition wall part 630, interferes therewith, and transmits torque to the partition wall part 630; and a lower rotation shaft 732 which passes through the lower rotation body 731 and is rotatably coupled to the lower arm part 740 so that the lower rotation body 731 rotates with respect to the lower arm part 740.

The lower rotation body 731 is rotated through an installed lower rotation part-driving part (not shown). The lower rotation body 731 is configured to rotate the cable drum unit 600 by rotating the partition wall part 630, and may have various configurations.

The lower rotation body 731 may be made of a material having a high friction coefficient such as rubber so as to increase friction on contact surface with the partition wall part 630. For another example, the lower protrusion portions 733 are formed as described above and may engage with the plurality of groove portions formed in the circumferential surface 631 of the partition wall part 630.

The lower rotation shaft 732 passes through the lower rotation body 731 so that the lower rotation body 731 is rotated with respect to the lower arm part 740. The lower rotation shaft 732 is configured to be rotatably coupled to the lower arm part 740, and may have various configurations.

The lower rotation shaft 732 is installed in parallel to the rotation shaft 610, and the cable drum unit 600 including the partition wall part 630 may be smoothly rotated through the rotation of the lower rotation body 731.

Also, a bearing is installed in a portion of the lower rotation shaft 732 coupled to the lower arm part 740, and thus, smooth rotation may be induced.

The lower rotation part-driving part (not shown) is configured to rotate the lower rotation part 730 and may be installed on the lower arm part 740 to rotate the lower rotation part 730. Any type of driving operation including hydraulic driving, electric driving, and magnetic driving disclosed according to the related art may be utilized.

The lower arm part 740 is configured to have one end to which the lower rotation part 730 is rotatably installed and the other end installed on the base 20, and may have various configurations.

For example, the lower arm part 740 is installed on the top surface of the base 20 and moves horizontally in a direction parallel to the top surface of the base 20. Thus, the lower rotation part 730 is moved forward toward the cable drum unit 600 or is moved backward toward the opposite side from the cable drum unit 600.

Also, the lower arm part 740 has a width greater than that of the groove portion 21 formed in the base 20 described above. When at least a portion of the lower rotation part 730 is inserted into the groove portion 21 of the base 20, the lower arm part 740 is supported by the top surface of the base 20 and may support the lower rotation part 730.

The lower arm part-driving part 750 is configured to linearly drive the lower arm part 740 toward the partition wall part 630 for close contact with the partition wall part 630 in a state in which the cable drum unit 600 is supported by the pair of the support units 800, and may have various configurations.

For example, the lower arm part-driving part 750 may include: a lower arm part-driving source 752 which is installed on the base 20; and a lower arm part-driving transmission part 751 which is installed between the lower arm part-driving source 752 and the lower arm part 740 to transmit driving force, which is transmitted from the lower arm part-driving source 752, to the lower arm part 740.

There may be various methods such as hydraulic driving, electric driving, and magnetic driving for the lower arm part-driving source 752, and in this case, the hydraulic driving may be applied.

Now, driving of the lower cable drum drive part 710 will be described.

When the cable drum unit 600 is supported by the pair of the support units 800 so as to collect the cable 2 or install the cable 2, the lower cable drum drive part 710 linearly moves toward the cable drum unit 600 in a state in which the cable drum unit 600 is supported. Thus, the contact state between the partition wall part 630 and the lower rotation part 730 may be maintained.

Furthermore, when the cable drum units 600 having different specifications are installed, since the contact positions become different, the lower cable drum drive part 710 may linearly move to maintain the contact state between the partition wall part 630 and the lower rotation part 730.

The upper cable drum drive part 720 is configured to rotate, while interfering with the partition wall part 630, above the center of the partition wall part 630, and may have various configurations.

Figure 9:
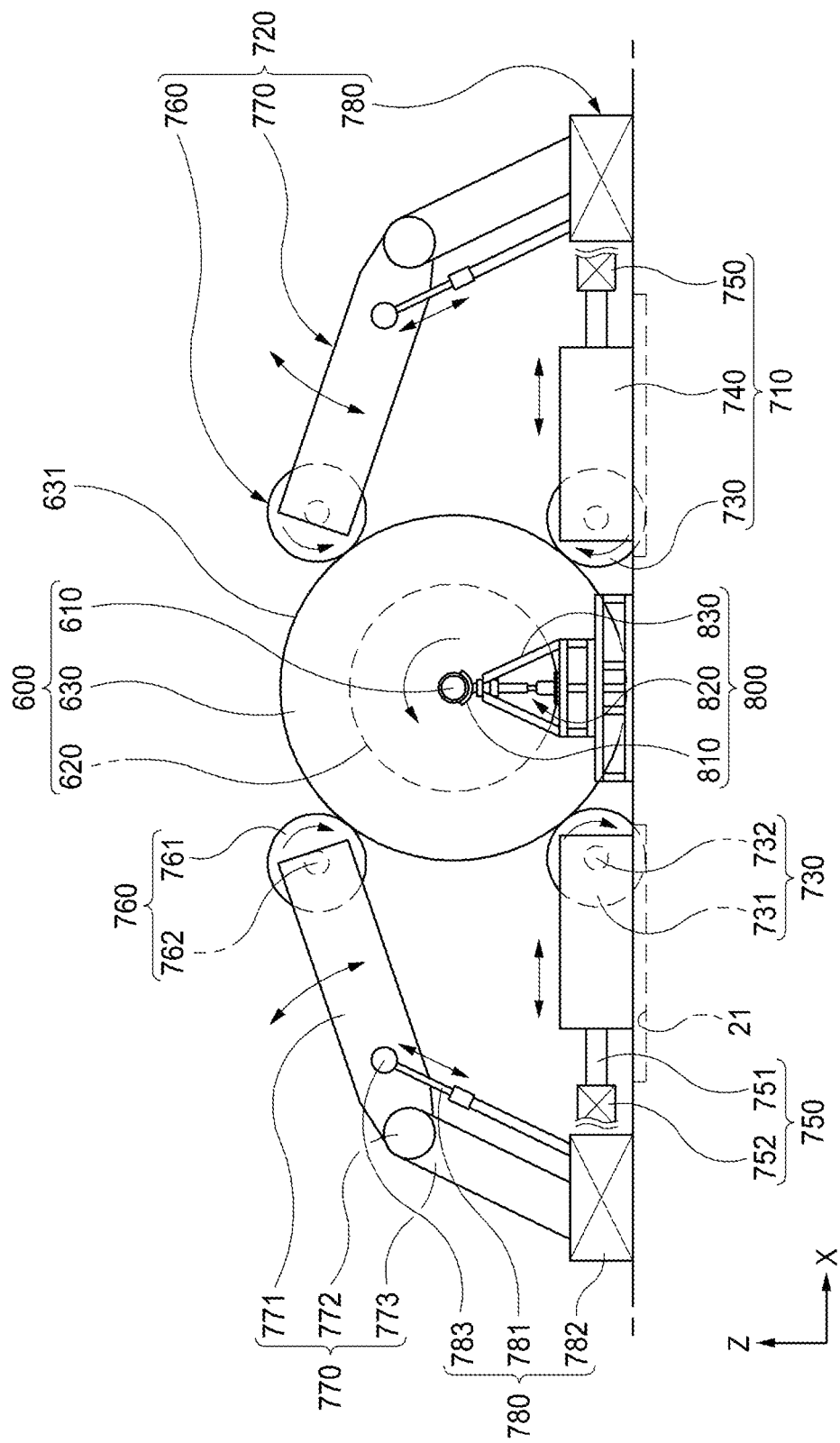
FIG. 9 is a plan view showing a state of an power transmission underground cable winding device according to the present invention.
Figure 10:
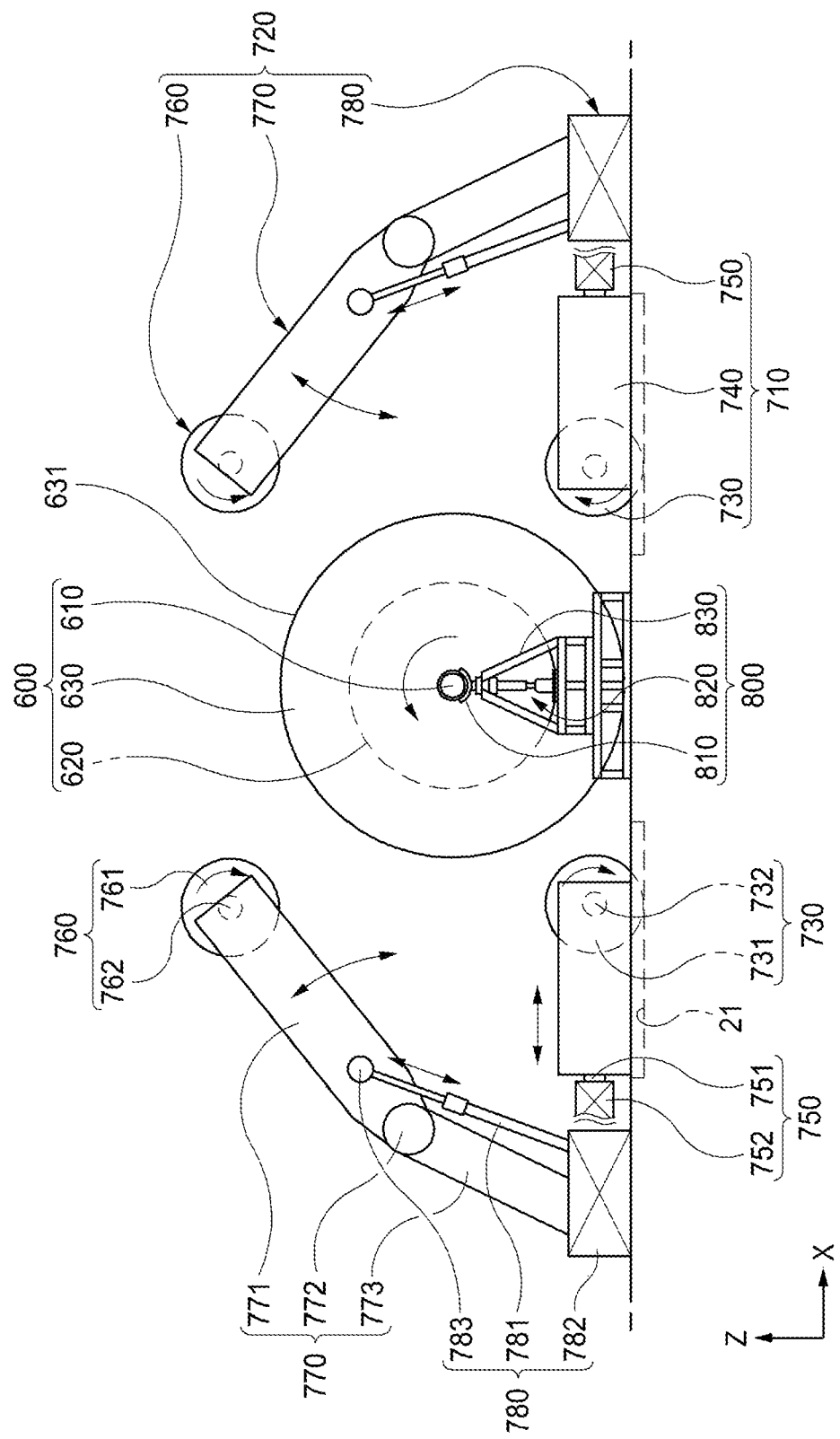
FIG. 10 is a plan view showing a state in which a cable drum is removed from the power transmission underground cable winding device of FIG. 9.
Figure 11:
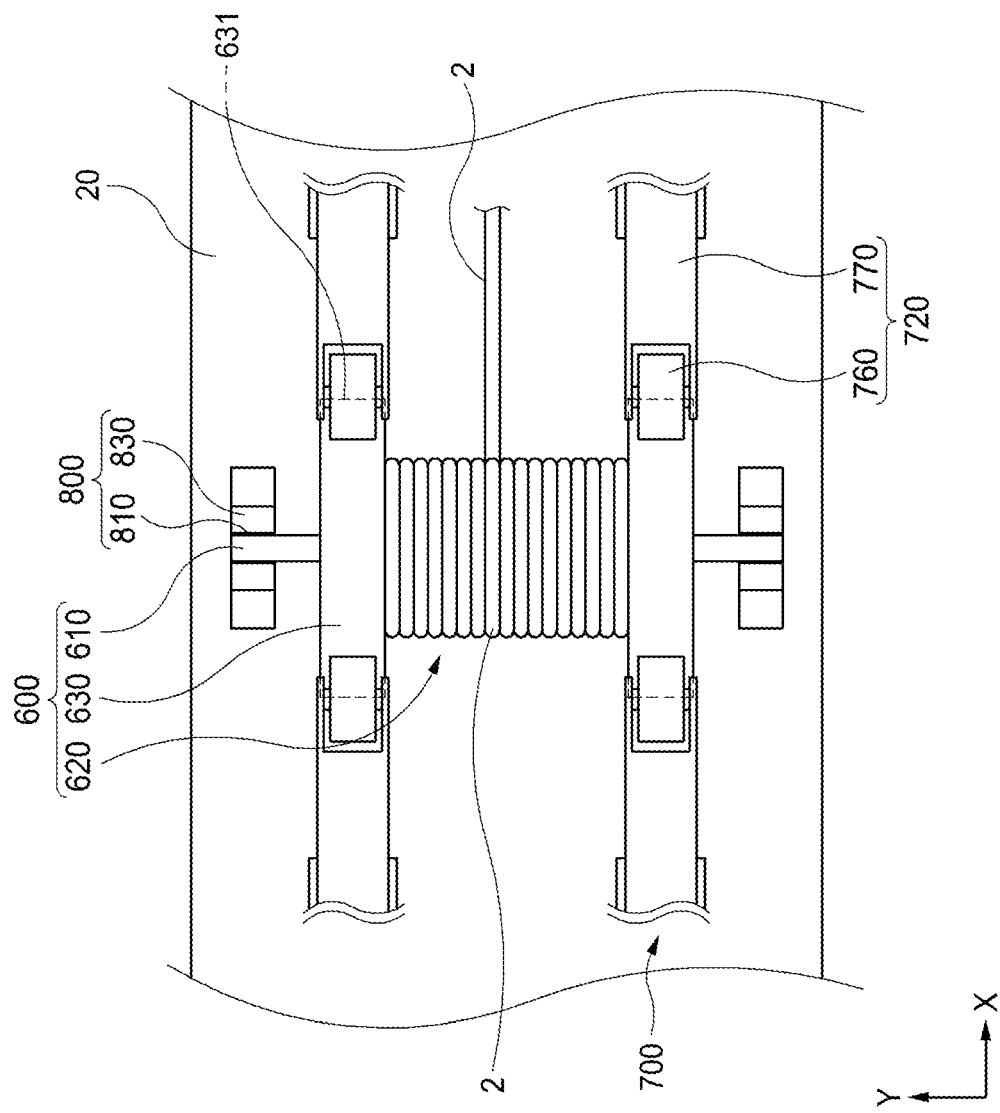
FIG. 11 is a front view showing a state of the power transmission underground cable winding device of FIG. 9.

For example, as illustrated in FIGS. 9 to 11, the upper cable drum drive part 720 may include: an upper rotation part 760 rotating in close contact with the partition wall part 630; an upper rotation part-driving part driven to rotate the upper rotation part 760; and an upper arm part 770 having one end to which the upper rotation part 760 is rotatably installed and the other end installed on the base 20.

Also, the upper cable drum drive part 720 may further include an upper arm part-driving part 780 which is driven to separate the upper arm part 770 from the partition wall part 630, thereby preventing interference with the partition wall part 630 while the cable drum unit 600 is supported by or removed from the pair of the support units 800.

Here, the configurations of the upper rotation part 760, the upper rotation part-driving part, the upper arm part 770, and the upper arm part-driving part 780 are generally the same as the configurations of the lower rotation part 730, the lower rotation part-driving part, the lower arm part 740, and the lower arm part-driving part 750 described above. Thus, the contents are the same as those described above except for the contents newly described below, and the same description will be omitted.

The upper rotation part 760 is configured to rotate in close contact with the partition wall part 630, and upper protrusion portions 733 may be formed on the outer circumferential surface so as to rotate while engaging with the plurality of grooves 632 of the partition wall part 630 described above. The upper rotation part 760 may include: an upper rotation body 761 which comes into close contact with the partition wall part 630, interferes therewith, and transmits torque to the partition wall part 630; and an upper rotation shaft 762 which passes through the upper rotation body 761 and is rotatably coupled to the upper arm part 760 so that the upper rotation body 761 rotates with respect to the upper arm part 770.

The upper arm part 770 is configured to have one end to which the upper rotation part 760 is rotatably installed and the other end installed on the base 20, and may have various configurations.

For example, the upper arm part 770 may include: a first upper arm 771 having an end connected to the upper rotation part 760; a second upper arm 773 having an end connected to the upper arm part-driving part 780; and a hinge part 772 rotatably coupled and installed between the first upper arm 771 and the second upper arm 773.

Through this, the first upper arm 771 and the second upper arm 773 of the upper arm part 770 may rotate at different angles with respect to the hinge part 772. As the first upper arm 771 is rotated through the upper arm part-driving part 780, which will be described later, with respect to the hinge part 772, the upper rotation part 760 may be adjusted to be separated from the partition wall part 630 or brought together.

Here, the hinge part 772 may allow the first upper arm 771 and the second upper arm 773 to rotate about an axis parallel to the rotation shaft 610.

The upper arm part-driving part 780 is configured to be driven to separate the upper arm part 770 from the partition wall part 630, thereby preventing interference with the partition wall part 630 while the cable drum unit 600 is supported by or removed from the pair of the support units 800, and may have various configurations.

As one example, the upper arm part-driving part 780 may rotate the upper arm part 770 with respect to a position coupled to the base 20.

Here, for another example, as illustrated in FIGS. 9 and 10, the upper arm part-driving part 780 includes: a fixing part 783 coupled to a side surface of the first upper arm 771; an upper arm part-driving source 782 installed on the base 20 and providing torque of the first upper arm 771; and an upper arm part-driving cylinder 781 installed between the fixing part 783 and the upper arm part-driving source 782. The length of upper arm part-driving cylinder 781 is changed by the upper arm part-driving source 782, and thus, a rotation angle of the first upper arm 771 may be changed.

For example, as illustrated in FIGS. 9 and 10, when the upper arm part-driving cylinder 781 rises, the first upper arm 771 rotates toward the opposite side from the cable drum unit 600, and removal and installation of the cable drum unit 600 become possible. The first upper arm 771 rotates toward the cable drum unit 600 by lowering the upper arm part-driving cylinder 781, and thus, the first upper arm 771 is brought into close contact with the partition wall part 630 of the cable drum unit 600, thereby rotating the cable drum unit 600.

Hereinafter, a power transmission cable spreading system for installing a power transmission cable through the power transmission underground cable pulling system and the power transmission underground cable winding device according to the related art will be described.

As illustrated in FIG. 8, the power transmission cable spreading system according to the present invention includes: three power transmission cables 2; a power transmission underground cable pulling system 40 for simultaneously pulling the three power transmission cables 2 by winding three wires 1 respectively connected to ends of the three power transmission cables 2; and three underground cable winding devices 30 for unwinding the three power transmission cables 2 through rotation in a state in which the three power transmission cables 2 are wound.

That is, the underground cable pulling system 40 described above is provided on one side with respect to an installation site, and the three underground cable winding devices 30 are provided on the other side. The cable 2 is pulled from the underground cable winding devices 30 through the underground cable pulling system 40, and at the same time, the cable 2 is unwound through the rotation of the underground cable winding devices 30. Thus, the power transmission underground cable may be installed in the installation site under the ground.

The above is merely described with respect to preferred embodiments that may be implemented according to the present invention, and thus as is well known, the scope of the present invention should not be construed as being limited by the above embodiment, the technical ideas of the present invention described above and technical concepts on the basis of these technical ideas are considered to be included in the scope of the present invention.

The invention claimed is:

1. A power transmission underground cable winding device for winding a power transmission underground cable installed under the ground, the power transmission underground cable winding device comprising:
  a base;
  a pair of support units installed spaced apart from each other on the base;
  a cable drum unit which is spaced apart from the base and supported by the pair of support units, and configured to unwind a power transmission cable, which has been wound, or wind and collect the power transmission cable through rotation; and a cable drum drive unit configured to rotate the cable drum unit, wherein the cable drum unit comprises:

a rotation shaft installed across the pair of the support units;

a winding part coupled to the rotation shaft and configured to unwind the power transmission cable, which has been wound, or wind and collect the power transmission cable through rotation; and a partition wall part expanding from at least one end of the winding part in a direction perpendicular to the rotation shaft, wherein the cable drum drive unit comprises at least one of a lower cable drum drive part which rotates, while interfering with the partition wall part, below a center of the partition wall part or an upper cable drum drive part which rotates, while interfering with the partition wall part, above the center of the partition wall part, wherein the lower cable drum drive part comprises:

a lower rotation part rotating in close contact with the partition wall part;

a lower rotation part-driving part driven to rotate the lower rotation part; and a lower arm part having one end to which the lower rotation part is rotatably installed and the other end installed on the base, wherein the lower cable drum drive part further comprises a lower arm part-driving part which linearly drives the lower arm part toward the partition wall part for close contact with the partition wall part in a state in which the cable drum unit is supported by the pair of the support units.

2. The power transmission underground cable winding device of claim 1, wherein the cable drum drive unit is installed to interfere with the partition wall part, rotates the partition wall part through rotation in an interference state, and rotates the cable drum unit about the rotation shaft.

3. The power transmission underground cable winding device of claim 1, wherein the partition wall part comprises a circumferential surface, which comes into close contact with the cable drum drive unit, to rotate through the interference as the cable drum drive unit rotates.

4. The power transmission underground cable winding device of claim 3, wherein the partition wall part has a plurality of grooves, which are formed on the circumferential surface and engage with the cable drum drive unit, to rotate while engaging with the cable drum drive unit.

5. The power transmission underground cable winding device of claim 1, wherein the pair of support units comprises:

a rotation shaft support part configured to rotatably support the rotation shaft; and a vertical drive part provided below the rotation shaft support part to drive the rotation shaft support part in an up-down direction.

6. The power transmission underground cable winding device of claim 5, wherein the vertical drive part is a hydraulic cylinder installed perpendicularly to the base.

7. The power transmission underground cable winding device of claim 1, wherein the upper cable drum drive part comprises:

an upper rotation part rotating in close contact with the partition wall part;

an upper rotation part-driving part driven to rotate the upper rotation part; and an upper arm part having one end to which the upper rotation part is rotatably installed and the another end installed on the base.

8. The power transmission underground cable winding device of claim 7, wherein the upper cable drum drive part further comprises an upper arm part-driving part which is driven to separate the upper arm part from the partition wall part, thereby preventing interference with the partition wall part when the cable drum unit is supported by or removed from the pair of the support units.

9. The power transmission underground cable winding device of claim 7, wherein the lower cable drum drive part and the upper cable drum drive part are symmetrical to each other with respect to the rotation shaft and installed on the partition wall part.

10. A power transmission underground cable spreading system comprising:

three power transmission cables for underground installation;

three underground cable winding devices according to claim 1, which unwind the three power transmission cables through rotation in a state in which the three power transmission cables are wound; and a power transmission underground cable pulling system configured to simultaneously pull the three power transmission cables by winding three wires respectively connected to ends of the three power transmission cables.

\* \* \* \* \*